Figure 1:
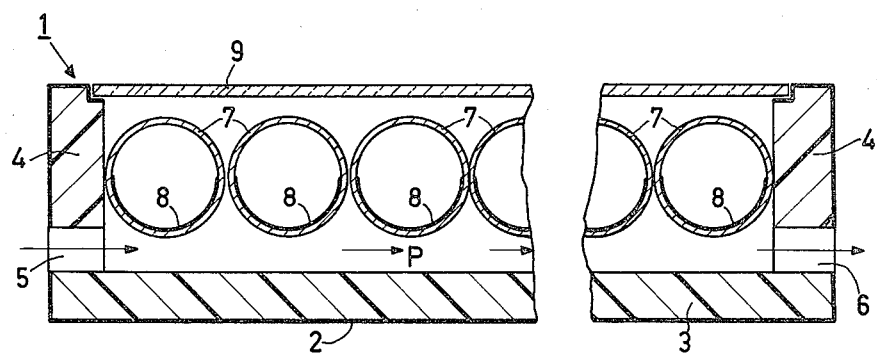

United States Patent [19]

Hermann et al.

[11] 4,319,559

[45] Mar. 16, 1982

[54] SOLAR COLLECTOR FOR HEATING A GASEOUS HEAT TRANSPORT MEDIUM

[75] Inventors: Wilhelm Hermann; Horst Hörster, both of Roetgen, Fed. Rep. of Germany

[73] Assignee: U.S. Philips Corporation, New York, N.Y.

[21] Appl. No.: 135,827

[22] Filed: Mar. 31, 1980

[30] Foreign Application Priority Data

Apr. 3, 1979 [DE] Fed. Rep. of Germany ....... 2913360

[51] Int. Cl.³ .......................... F24J 3/02; F28F 13/00
[52] U.S. Cl. .................................. 126/442; 126/449; 165/136
[58] Field of Search ............... 126/449, 446, 442, 443, 126/448, 429, 417, 450; 165/135, 136

[56] References Cited

U.S. PATENT DOCUMENTS

| | | | |
|---|---|---|---|
| 4,054,125 | 10/1977 | Eckels | 126/449 |
| 4,116,225 | 9/1978 | Ortabasi | 126/448 |
| 4,128,095 | 12/1978 | Oren et al. | 126/449 |
| 4,141,338 | 2/1979 | Lof | 126/449 |
| 4,141,339 | 2/1979 | Weinstein | 126/449 |
| 4,142,511 | 3/1979 | Doughty et al. | 126/449 |
| 4,191,170 | 4/1980 | Carrell | 126/449 |
| 4,205,658 | 6/1980 | Clark | 126/449 |
| 4,210,126 | 7/1980 | Kellberg et al. | 126/448 |
| 4,213,450 | 7/1980 | Perez | 126/448 |
| 4,226,227 | 10/1980 | Harupa | 126/448 |

*Primary Examiner*—Daniel J. O'Connor
*Attorney, Agent, or Firm*—Thomas A. Briody; William J. Streeter; Rolf E. Schneider

[57] ABSTRACT

A solar collector for heating a gaseous heat transport medium comprises an open-top housing provided with a transparent cover layer formed of a plurality of adjacently arranged, substantially mutually contacting, sealed and evacuated transparent cover tubes. The inner surface of each cover tube is provided with a selective absorption layer over the half facing the interior of the housing. The surface of the housing bottom facing the cover tubes has a vaulted profile corresponding to the shape of the cover tubes. An inlet and an outlet are respectively provided in the opposite sidewalls of the housing for flow of the gaseous heat transport medium transversely of the cover tubes in direct thermal contact herewith.

4 Claims, 3 Drawing Figures

SOLAR COLLECTOR FOR HEATING A GASEOUS HEAT TRANSPORT MEDIUM

This invention relates to a solar collector for heating a gaseous heat transport medium, comprising of a thermally insulated housing which is provided with a transparent cover layer and which has an inlet and an outlet for the heat transport medium, between the inlet and the outlet there being arranged an absorber which exchanges heat with the heat transport medium. The gaseous heat transport medium normally is air.

In known solar collectors of this kind, the cover layer of the housing normally comprises one or two transparent glass panes, the absorber being arranged between these panes and the bottom of the housing so that it is more or less in direct contact with the heat transport medium flowing therethrough.

However, gaseous heat transport media, notably air, have only a comparatively low heat transfer coefficient with the abosrber. This results in rather high absorber temperatures and hence comparatively high heat losses via the cover.

The present invention has for its object to provide a solar collector for gaseous heat transport media which involves low heat losses and thus offers a higher efficiency.

This object is realized in accordance with the invention in that the cover layer consists of a number of adjacently arranged, substantially mutually contacting, sealed and evacuated transparent tubes, the inner surface of each of which is covered with a selective absorption layer over the half facing the interior of the housing.

For solar radiation (0.3 to 2.5 $\mu$m), selective absorbers have an absorption coefficient $\alpha \geq 0.85$ and an emission coefficient $\epsilon \leq 0.15$ for thermal radiation (3 to 30 $\mu$m). Selective absorbers of this kind can be formed, for example, as a nickel or cobalt oxide or a cobalt sulphoxide layer ($CoS_xO_4$) on a metal substrate (Ag, Cu, Al).

Preferably, the lower halves of the cover tubes forming the absorber are in direct contact with the gaseous heat transport medium over their full length.

By means of such a solar collector, the K value can be reduced from approximately 8.0 W/m$^2$K to approximately 2.5 W/m$^2$K at normal operating temperatures. This is an increase of efficiency $\eta$ from 0.24 to 0.63.

A cover layer consisting of evacuated tubes for a solar collector for liquid heat transport media is known from U.S. Pat. No. 4,091,793. However, the inner surfaces of the tubes thereof are provided only with an infrared reflective layer.

From U.S. Pat. No. 4,144,875 solar collector for liquid heat transport media is known which has a cover consisting of evacuated tubes, the inner surface of each of which is covered by a selective absorption layer, but which are in contact with a heat exchanger wherethrough a heat transport medium flows.

In order to improve the contact between the flowing gaseous heat transport medium and the cover tubes of the absorber, a preferred embodiment of the solar collector in accordance with the invention is characterized in that the surface of the housing bottom which faces the cover tubes has a vaulted or corrugated profile which corresponds or is adapted to the shape of the cover tubes. Preferably, the distance between the cover tubes and the vaulted bottom of the housing varies from approximately 0.5 to 3 cm. The vaulted profile of the bottom of the housing may comprise an insulating material in accordance with the invention.

For weatherproof sealing, a seal of an elastic material can be provided between the individual tubes as well as between these tubes and the oppositely disposed sidewalls of the housing. For the elastic seals use can be made of, for example, strips of a silicone rubber, notably of the foam type.

The ends of the cover tubes may be accommodated in the housing, for example, by being supported on the oppositely disposed endwalls of the housing. In a further preferred embodiment of the solar collector in accordance with the invention, however, the cover tubes are respectively accommodated in elongate bags which are interconnected and which are formed of a transparent foil material, said foil material also being connected to the sidewalls of the housing. This transparent foil material may comprise of a synthetic material, for example, a polytetrafluoroethylene or a polyvinylfluoride which is heat resistant up to a temperature of 200° C.

For the protection of the cover tubes and for the sealing of the housing, an additional transparent shielding pane can be arranged over the cover tubes in an airtight and watertight manner.

Figure 2:
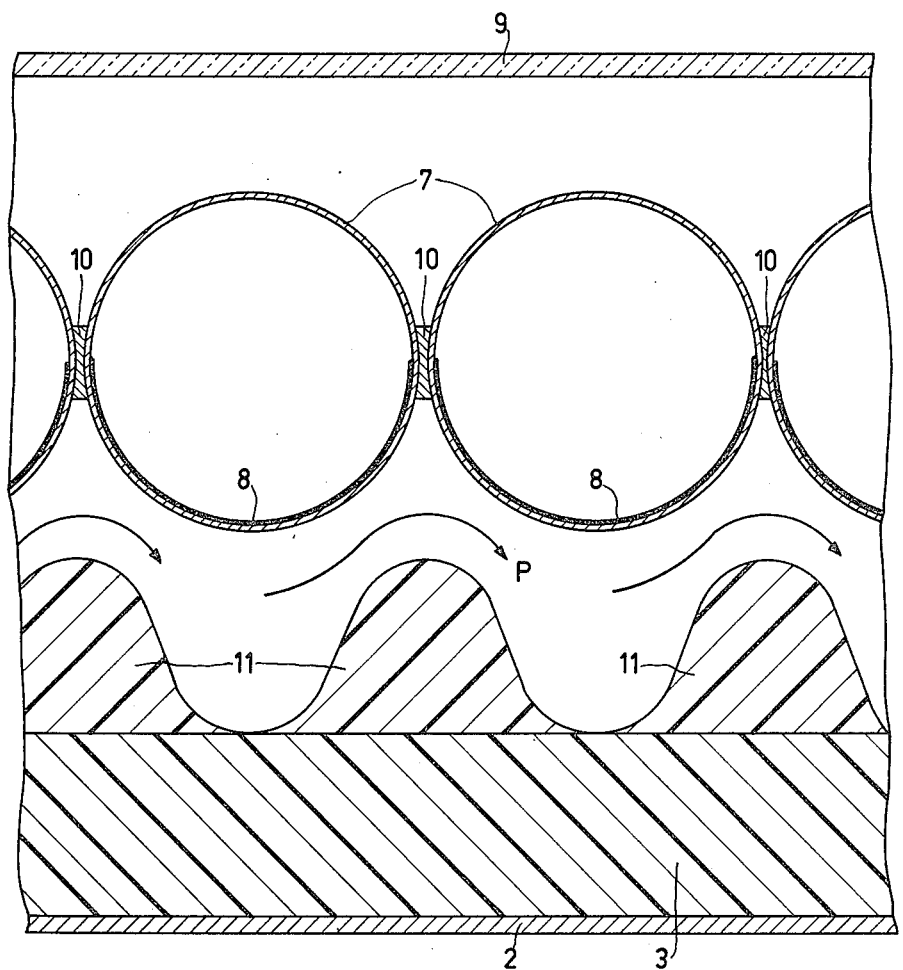
Figure 3:
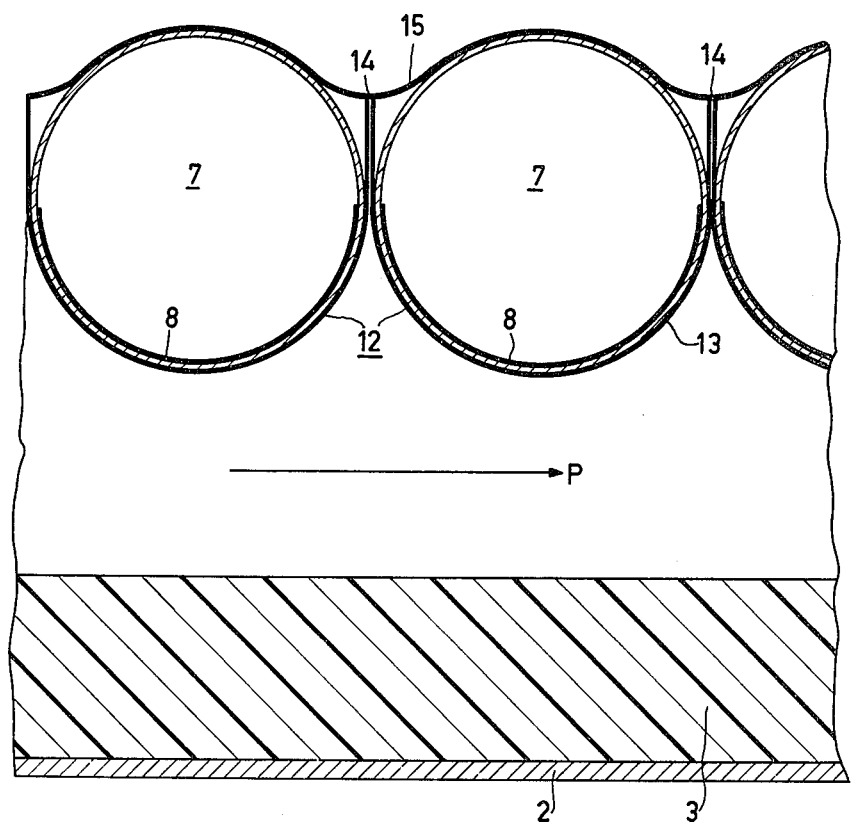

The invention will now be described in detail with reference to the accompanying drawings, in which:

FIG. 1 is a sectional view, with a part cut away, of a solar collector in accordance with the invention, FIG. 2 is a partial sectional view of a detail of a further embodiment of the solar collector in accordance with the invention, and FIG. 3 is a partial sectional view of a further still embodiment of a solar collector in accordance with the invention.

The solar collector shown in FIG. 1 comprises an open-top housing 1 which comprises a trough-shaped metal cabinet 2, the inner surface of which is provided with insulation comprising, for example, polyurethane or glass wool. The bottom of the housing thus formed is denoted by the reference numeral 3 and the oppositely disposed sidewalls of the housing are denoted by the reference numeral 4. The housing respectively includes an inlet 5 and an outlet 6 in such sidewalls for transverse flow of a gaseous heat transport medium, for example, air. Just above the heat transport medium flow (arrow P) several round glass tubes 7 are adjacently arranged, substantially in contact with each other, in order to cover the housing 1, the tubes being sealed at their ends and evacuated to a residual gas pressure of less than 1 mbar. The interior surface of the half of the glass tubes 7 which faces the bottom 3 is covered with a selective absorption layer 8, for example, consisting of $CoS_xO_4$. It is thus achieved that the gaseous heat transport medium entering via the inlet 5 is conducted in direct contact with the under side of the glass tubes 7, so that heat is exchanged between such heat transport medium and the glass tubes 7 which are heated via the absorption layers 8, after which the heated gaseous heat transport medium leaves the housing 1 via the outlet 6 in order to be transported to a user or an accumulator. Moreover, in the housing 1 and above the cover tubes 7 a transparent shielding pane 9 which may comprise, for example, glass, is arranged in an airtight and watertight manner.

In the solar collector shown in FIG. 2, a seal 10 which comprises of an elastic material, for example, silicone rubber, is provided between the individual cover tubes 7 and between these tubes and the sidewalls 4 of the housing. Moreover, the bottom surface 3 of the housing 1 which faces the cover tubes 7 has a vaulted or corrugated profile which is adapted to the shape of the cover tubes 7 so that the gaseous heat transport medium flow (arrow P) is transversely conducted just below the cover tubes 7, whereby the gaseous heat transport medium is brought into even better contact with the absorber cover tubes 7. It has been found in practice that the distance between the cover tubes 7 and the vaulted profile 11 of the bottom of the housing 3 preferably varies between 0.5 and 3 cm. The vaulted profile 11 of the bottom 3 of the housing preferably also comprises of an insulating material, preferably the same material as the insulation of the cabinet 2.

In the solar collector shown in FIG. 3, the cover tubes 7 are respectively accommodated in long interconnected bags 12 which may be formed of a transparent foil material, for example, a heat resistant synthetic material. The foil 13 is folded in an undulating manner and is connected, at the areas 14, to a similar cover foil 15, for example, by heat sealing. The bags 12 are also connected to the housing 1, notably to the sidewalls 4 of the housing.

What is claimed is:

1. A solar collector for heating a gaseous heat transport medium, which comprises a thermally insulated open-top housing having a bottom, oppositely disposed endwalls, and oppositely disposed sidewalls; a transparent cover layer formed of a plurality of adjacently arranged, substantially mutually contacting, sealed and evacuated transparent cover tubes spaced from the housing bottom and positioned substantially parallel to the sidewalls, the inner surface of each cover tube being provided with a selective absorption layer over the half facing the interior of the housing, the surface of the housing bottom facing the cover tubes having a vaulted profile corresponding to the shape of the cover tubes; and an inlet and an outlet respectively provided in the sidewalls for flow of the gaseous heat transport medium transversely of the cover tubes in direct thermal contact therewith, wherein said solar collector includes elongate, interconnected bag means formed of a transparent foil material for respectively accommodating the cover tubes, said foil material also being connected to the sidewalls of the housing.

2. A solar collector according to claim 1, in which the distance between the cover tubes and the vaulted housing bottom varies from 0.5 to 3 cm.

3. A solar collector according to claim 1, in which a seal of an elastic material is provided between adjacent cover tubes and between each end cover tube and its respective sidewall.

4. A solar collector according to claim 1, 2, or 3, which includes a transparent protective pane positioned in the housing over and spaced from the cover tubes.

* * * * *